(12) United States Patent
Johnson

(10) Patent No.: US 7,714,880 B2
(45) Date of Patent: May 11, 2010

(54) METHOD AND APPARATUS FOR DISPLAYING IMAGES ON A DISPLAY

(75) Inventor: Michael J. Johnson, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 546 days.

(21) Appl. No.: 10/125,747

(22) Filed: Apr. 18, 2002

(65) Prior Publication Data

US 2003/0095155 A1 May 22, 2003

Related U.S. Application Data

(60) Provisional application No. 60/332,357, filed on Nov. 16, 2001.

(51) Int. Cl.
*G09G 5/00* (2006.01)
(52) U.S. Cl. ............................. 345/672; 345/8; 345/156; 345/158; 345/173; 345/204
(58) Field of Classification Search ................. 345/684, 345/473, 672, 864, 648–650, 653, 659, 676, 345/679, 680–681, 687, 158, 169, 619, 654, 345/7, 8, 633, 156, 173, 204; 715/863–864, 715/700, 764, 784
See application file for complete search history.

(56) References Cited

U.S. PATENT DOCUMENTS

| 5,602,566 A | 2/1997 | Motosyuku et al. |
| 5,714,972 A * | 2/1998 | Tanaka et al. ............... 345/156 |
| 5,910,797 A | 6/1999 | Beuk |
| 6,151,208 A | 11/2000 | Bartlett |

(Continued)

FOREIGN PATENT DOCUMENTS

EP 0 510 939 A2 10/1992

(Continued)

OTHER PUBLICATIONS

Verplaetse, C., "Inertial proprioceptive devices: Self-motion-sensing toys and tools," IBM Systems Journal, vol. 35, Nos. 3&4, pp. 639-650, 1996.

(Continued)

*Primary Examiner*—M Good Johnson
(74) *Attorney, Agent, or Firm*—Shumaker & Sieffert, P.A.

(57) ABSTRACT

Combining one or more spatio-temporal sensors with a personal digital assistant or similar small electronic device and with sliding window (roaming and stabilization) software and memory management and user interface functions, to enable a user to see documents and objects that appear to be fixed in space. This may allow the user to navigate using his or her eidetic memory. Navigation of images, documents or other objects substantially bigger than the display is made easier and faster. Using the invention, the user scrolls and views larger documents or objects as if they were affixed in space to a selected viewing platform. The viewing platform can correspond to, for example, the ground, a building, a wall, an arbitrary reference point, or any other suitable fixed or substantially fixed position or object. The invention uses and adjusts for the body-arm-hand-finger motion of the user so that the imagery appears affixed to the selected reference platform.

3 Claims, 8 Drawing Sheets

U.S. PATENT DOCUMENTS

| | | | |
|---|---|---|---|
| 6,288,704 B1* | 9/2001 | Flack et al. | 345/158 |
| 6,297,795 B1* | 10/2001 | Kato et al. | 345/684 |
| 6,317,114 B1* | 11/2001 | Abali et al. | 345/672 |
| 6,414,684 B1* | 7/2002 | Mochizuki et al. | 345/473 |
| 6,567,068 B2 | 5/2003 | Rekimoto | |
| 6,624,824 B1* | 9/2003 | Tognazzini et al. | 345/684 |
| 6,690,358 B2* | 2/2004 | Kaplan | 345/158 |
| 6,847,351 B2* | 1/2005 | Noguera | 345/158 |
| 7,007,242 B2* | 2/2006 | Suomela et al. | 715/849 |
| 7,019,319 B2* | 3/2006 | Lapstun et al. | 345/156 |
| 7,142,191 B2* | 11/2006 | Idesawa et al. | 345/156 |
| 7,289,102 B2* | 10/2007 | Hinckley et al. | 345/156 |
| 2002/0075335 A1* | 6/2002 | Rekimoto | 345/864 |
| 2002/0158815 A1* | 10/2002 | Zwern | 345/7 |
| 2002/0190947 A1* | 12/2002 | Feinstein | 345/158 |
| 2003/0006975 A1* | 1/2003 | Moriya et al. | 345/179 |
| 2004/0027330 A1* | 2/2004 | Bradski | 345/158 |
| 2004/0233160 A1* | 11/2004 | Chincholle et al. | 345/156 |
| 2005/0216867 A1* | 9/2005 | Marvit et al. | 715/863 |
| 2006/0017692 A1* | 1/2006 | Wehrenberg et al. | 345/158 |
| 2006/0061550 A1* | 3/2006 | Fateh | 345/158 |
| 2006/0129951 A1* | 6/2006 | Vaananen et al. | 715/864 |
| 2006/0164382 A1* | 7/2006 | Kulas et al. | 345/156 |
| 2006/0268008 A1* | 11/2006 | Idesawa et al. | 345/623 |
| 2006/0284792 A1* | 12/2006 | Foxlin | 345/8 |
| 2007/0268246 A1* | 11/2007 | Hyatt | 345/156 |
| 2008/0012822 A1* | 1/2008 | Sakhpara | 345/156 |
| 2008/0088602 A1* | 4/2008 | Hotelling | 345/173 |
| 2008/0150921 A1* | 6/2008 | Robertson et al. | 345/204 |

FOREIGN PATENT DOCUMENTS

| | | |
|---|---|---|
| EP | 0 825 514 A2 | 2/1998 |
| FR | 2 788 151 A1 | 7/2000 |
| WO | WO 99/18495 | 4/1999 |
| WO | WO 01/27735 A1 | 4/2001 |
| WO | WO 01/78055 A1 | 10/2001 |

OTHER PUBLICATIONS

Rekimoto, Jun, "Tilting Operations for Small Screen Interfaces (Tech Note)," Sony Computer Science Laboratory Inc.

Bartlett, Joel F., "Rock 'n' Scroll is Here to Stay," COMPAQ Western Research Laboratory, IEEE Computer Graphics and Applications, May 2000.

Small, D. and Ishii, H., "Graspable Interface Design," General Exam-Hiroshi Ishii, pp. 1-8, 1997.

U.S. Appl. No. 60/332,357, entitled "Method and Apparatus for Displaying Images on a Display," filed Nov. 16, 2001.

International Search Report for PCT/US02/36258, 9 pages, dated Oct. 25, 2005.

Notification of Reasons for Refusal from corresponding Japanese Application No. 2003546287, 4 pgs., dated May 30, 2008.

Examiner's First Report On Patent from corresponding Australian Application No. 2002366070, 2 pages, dated Jan. 31, 2006.

* cited by examiner

METHOD AND APPARATUS FOR DISPLAYING IMAGES ON A DISPLAY

This application claims the benefit of U.S. provisional application Ser. No. 60/332,357, entitled "Method and Apparatus for Displaying Images on a Display," filed Nov. 16, 2001, wherein such document is incorporated herein by reference.

BACKGROUND

Portable information appliances, including personal digital assistants (PDA's), portable PCs, cell phones, digital watches, laptops, etc. are valued because they are small and portable. All else being equal, the smaller these devices are the more valuable they are except for the human interface such as the display. Generally, consumers want bigger displays with more pixels so that more information can be displayed on a single screen. Depending on the function of the portable information appliance, there is often a balance that must be struck between portability and viewing area.

A PDA (e.g., Palm®) is an example of a portable information appliance that may strike such a balance. The PDA often fits into a shirt pocket and has a screen of about 3"×3" and 160×160 pixels. While highly functional for many applications, including listing contact information, tasks and notes, it has proven difficult to use for a wide range of other applications. Full web pages, images like photos or maps, or large forms or schematic diagrams cannot readily be viewed on such small screens. Scroll functions are often available, but rarely used because the user tends to easily get lost while pushing the document up and down across the display surface. In short, it is often difficult to envision the document without a point of reference or some mnemonic.

For those applications where it is desirable to view larger documents or objects, handheld computers and laptops, which have bigger screens, have been the traditional solution. Between these two extremes, however, there are a vast number of applications that cannot readily be accommodated.

SUMMARY

The present invention provides a method and apparatus that allows a user to view a document, image or object that appears stationary in space while the portable information appliance is moved. This allows the user to call on his or her natural abilities (eidetic memory, "Mind's Eye"...) to associate object components with locations in space, which may allow the user to remain better oriented and to navigate the object space and attributes more efficiently.

In one illustrative embodiment, a PDA, a Pocket PC or other portable information appliance includes a position sensor system. The device is tuned for low power and portable applications, and is also tuned to the relatively narrow range of human (body-arm-hand-finger) movement (position, velocity, acceleration of the body-arm-hand-finger-portable device mass). Sliding window software is provided, which imparts motion to the imagery shown on the display. The sliding window software is compensated with respect to the user's body-arm-hand-finger system.

The illustrative embodiment also stores the image content, often in a vector or bitmap or similar rendering base format. The user is allowed to view an object through the portable display window, where the object appears to be affixed to a reference platform. The reference platform may be, for example, a room, a building, a wall, the earth, or any other reference coordinate or location, as desired.

In one embodiment, the invention provides a viewing system including a position sensor attached to a display, where the position sensor is moveable relative to a reference in a virtual image and the display shows at least a portion of the virtual image. By moving the position sensor, the user can move about and view various portions of the virtual image. In a further embodiment, the invention provides a method for viewing a virtual item on a display screen by putting at least a region of the virtual item into a memory, viewing a portion of the region of the virtual item on the display, and moving the display to view another portion of the region.

Rather than using position sensors (mouse, tracking ball, screen pens...) to scroll imagery across a display window, the illustrative embodiment may change the display window imagery based on the relative position of the portable information appliance to the selected platform reference point(s). This allows the user to envision the document as being stabilized or fixed relative to a room, wall, earth, etc., which may make it easier to navigate large documents more effectively.

BRIEF DESCRIPTION OF THE DRAWING

FIGS. 8A-8E show an application of the invention for tracking facial features.

DESCRIPTION

Figure 1:
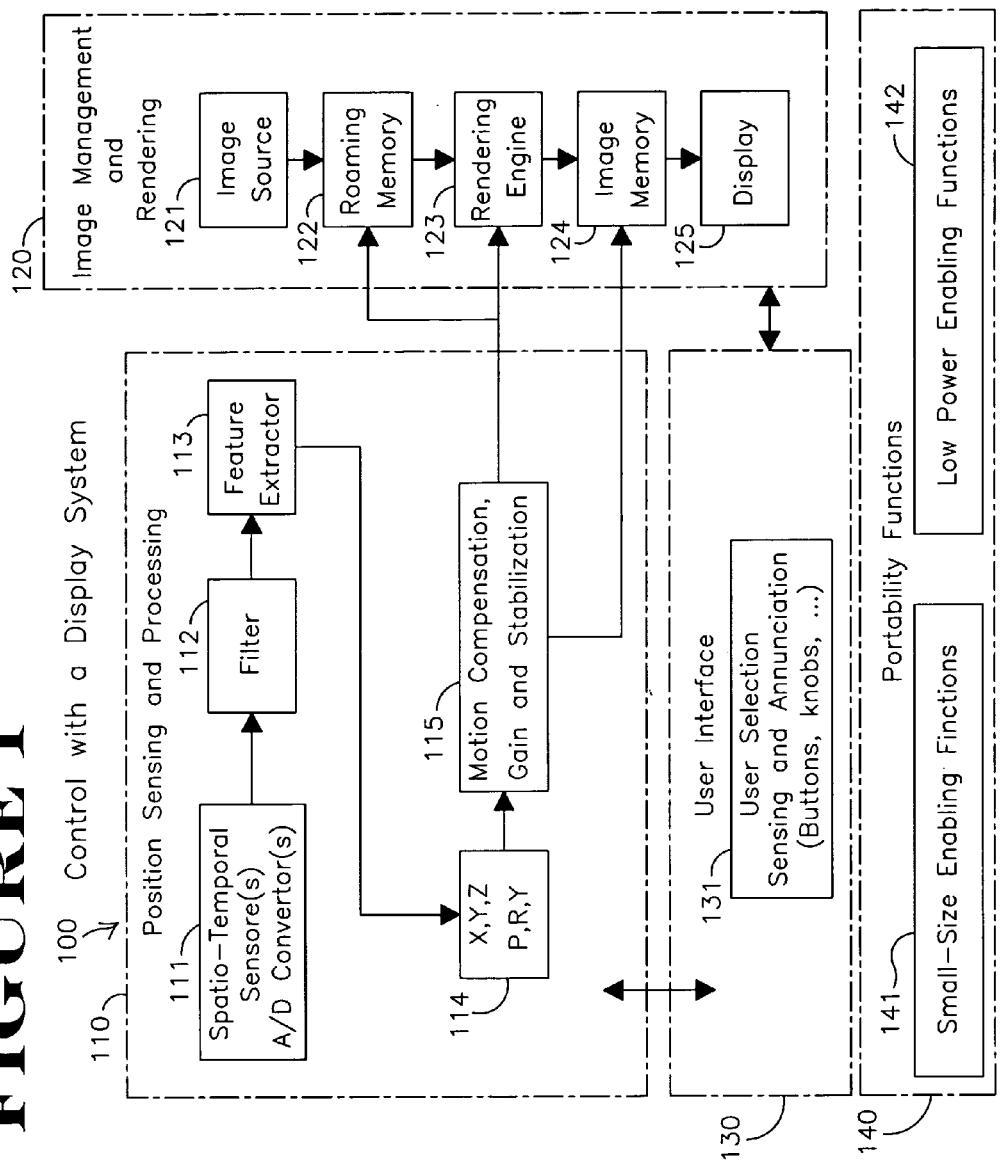
FIG. 1 is a block schematic of an embodiment of the invention.

As shown in FIG. 1, one illustrative embodiment 100 of the present invention includes a position sensing and processing block 110, an image management and rendering block 120, a user interface block 130 and a portability functions block 140.

The position sensing and processing block 110 provides the position sensing and/or environmental compensation functions used by the system to acquire the position information for the device. In the illustrative embodiment, the position sensing and processing block 110 includes a spatial-temporal (and/or other) sensors and A/D converter block 111, a data filter block 112, a feature extractor block 113, a state variables x, y, z, pitch (P), roll (R) and yaw (Y) (and others including time and temperature as required) block 114, and a motion compensation and gain and stabilization function block 115.

The data filter block 112 may be implemented in analog or digital form, as desired. When in digital form, one or more commonly used window functions may be applied including, for example, Hanning, Hamming, Blackman, Kaiser (with selected values of alpha), etc., followed by finite impulse response (FIR) filtering functions, as desired. Alternatively, the filter can be implemented using infinite impulse response (IIR) methods or more specifically Kalman techniques. These may be used to improve the signal to noise ratio, and may do so by reducing noise levels, constraining the signal to the band of interest (less than approximately 30 Hz for hand-held uses) and to correlate readings to enable faster and more accurate response times.

Platform motion compensation involves compensation of vibration or torque associated with the reference platform that may be provided in some applications. For example, unwanted vibration or torque may be present when the device is used aboard an aircraft under turbulent conditions or aboard a ship. Compensation of such vibration or torque may be provided by providing platform state variables to the portable information appliance. In the case of an aircraft, the vibration of the aircraft may be known to a large degree and may be known to a finer and more immediate degree by adding sensors to the aircraft for the purpose of compensating for the aircraft motion not intended for viewing on the device. This represents an additional component that may be included in the portable information appliance, if desired.

The image management and rendering block 120 may include a database or storage or communication facility to acquire or store a picture or representation of a full object. Included may be bit maps, web pages, texture maps, multi-resolution images, attributes, elevation data, 3D model attributes and vertex lists, etc., as needed to render the document(s) or object(s) of interest on the display of the portable information appliance. Collectively, this functionality may be called the image source module 121.

Typically, PDA's today have about 8 or more Mbytes of memory available. In addition to accommodating standard PDA storage functions, this memory must be re-allocated over the image source, roaming memory, rendering buffers, program and data store (not shown) and image memory, if desired.

In addition, PDA's and other portable information appliances often have one or more communication ports, such as RS-232, Infra Red, USB, or other communication ports, as well as in some cases I/O ports connecting to the PDA system bus. In some embodiments, such communication ports may be used to transmit data to the portable information appliance periodically or in real-time in a delta update fashion (incrementally supplying the information as needed or in background mode).

Regarding document, image and object storage requirements, an 8 bit per pixel black and white 1280×1024 image to be shown consumes in uncompressed form about 1.3 Mbytes. A 24 bit per pixel color 1280×1024 image consumes about 3.9 Mbytes in raw form. The image may be any type of image, such as a web page with graphics embedded, a Word® or other processor document which has been rendered in a bitmap or other format, a map, a 3D rendered object, or any other image as desired.

In some cases, a compression algorithm may be used to pre-process the imagery to be stored in the portable information appliance. A compatible decompression algorithm implemented in the portable information appliance can then be used to reconstruct the image periodically or in real-time. The reconstruction can be applied to the whole image, or to segments of the image, to supply imagery or image attributes to the roaming memory function 122 downstream. JPEG is one such compression algorithm, which the portable information appliance can use to compress the images by a factor of 10, 20 or more for example, thereby enabling the device to store more content. Taking roaming memory 122 in conjunction with the stabilization aspect of component 115, one can have roaming and stabilization for a sliding window effectuation.

In one illustrative embodiment of the present invention, images can be converted to single-bit, diffusion halftone images to match the black and white display capability of a PDA and to minimize the files size and memory needed. A 1280×1024 image stored in this form consumes about 163 Kbytes. The images can be stored in multi-resolution forms to support different levels of detail, scaling, and magnification functions on the 160×160 pixel display of a PDA. The total image source memory consumed for each page is therefore as follows: 1280×1024, 640×512, 320×256, 160×128 or 160× 218 Kbytes. To support multiple resolutions and levels of detail for a given large document, a geometric progression of memory totaling about 1.33 times the memory required for the base image may be used (the total of $1+\frac{1}{4}+\frac{1}{16}+\frac{1}{64}...$ which limits at 1.33 times the base image size).

The roaming memory component 122 may include RAM, addressing and address computation, and caching functions. One function that may be included in the roaming memory component 122 is a look ahead-function, which looks ahead and stores image content as needed and as anticipated by filtered velocity and acceleration data. The roaming memory component 122 may also be used to store the entire image or selected segments of the image that are visible or about to be visible to the user. For example, the roaming memory component 122 may store a region of interest around the point of observation whose extent may be constrained by velocity and acceleration components along any of, for example, six degrees of freedom.

The roaming memory component 122 may also be used to contain the image data itself and/or information and instructions needed to affect the rendering of the document or object space. These may include, for example, elevation points, model vertices, color attributes, vector instructions, OpenGL instructions, Postscript instructions, etc. Because the memory of many portable information appliances is often segmented, the image itself, while it may be available in whole form, may also be segmented and reassembled by the roaming memory component 122 and rendering engine functions block 123, working in concert. The roaming memory component 122 can be used to affect a coarse grained motion rendering function, moving patch by patch or block by block through the object space. Roaming memory 122 can be considered as a buffer to allow real-time information, thereby permitting the user to pivot and translate x, y and z information.

The rendering engine 123 may include a mix of hardware, firmware and/or software, as desired, to render or resize or re-address in more fine grained detail the position or attributes of documents or objects to be placed into the image memory 124 for the image to be displayed. A typical hardware renderer may include a graphics chip having vector generator functions, geometry engine functions, tiling and stitching functions, occlusion functions, prioritization functions, and/ or hidden surface removal and shading and highlighting and lighting functions. Any mix of these may be used or present, as desired. More often, the functions will include vector generator, stitching and scaling and image motion functions.

In one illustrative embodiment, the roaming memory component 122 and rendering engine 123 receive position, velocity and/or acceleration data from the motion compensation, gain and stabilization module 115. The rendering engine 123 renders the result as an image in the image memory 124. The image memory 124 may include RAM, addressing, raster scanning control and/or timing and readout shift register functions. This functionality is often part of portable information appliances. The illustrative embodiment may scan the image memory 124 using the raster scanning control and timing functions, output the pixels in parallel, horizontal segment by segment into a readout shift register. The readout shift register may then transmit the pixel information (color, gray level in 1, 2, 4 or 8 bits per primary color for example) to display 125 which converts the digital stream of pixels into an image, often monochrome and more often now in color.

In an illustrative embodiment, the sensor update is synchronized with the image update to reduce the perception of transport delay and positional variance. In this way, the image shown on the screen of a PDA, for example, may match the actual location sensed as closely as possible. The video update (screen update of the document or object image) signal may, for example, trigger the reading of the sensors in a synchronous manner. Sensor positional update may be driven by the vertical refresh signal or a signal, which may be an integer harmonic of the vertical refresh signal. For example, reading the sensors at a 15 Hz rate as derived from the 30 Hz PDA screen update or refresh signals may improve perceived positional accuracy. Also, the screen may be refreshed using the image memory (or memories) at vertical sync to preclude mid-screen shears or tears as the image is updated.

In the illustrative embodiment, the user interface module 130 may allow the user to select modes, scales, gain and effect compensation. Modes may include, for example, discrete or continuous compensation. Scales may include, for example, affect fine or coarse grained imagery. Gain may affect conformal mapping and/or scaled motion and presentation. Compensation may allow the user to cause the system to null out errors. Other modes may allow navigation of objects in the x and y directions alone or in combination with other degrees of freedom. In some embodiments, object opacity or transparency may also be selected.

In some embodiments, the user may select hybrids or one or the other of the objects as stationary or mobile modes. In addition, hysteresis of motion (lock and jump) may be selected. The user asserts his or her choices via physical buttons, knobs, touch pad, etc. or icons on the display via user selection component 131. The state of these selections may be made available to the user via an appropriate annunciation means. (See below description on the user interface involving display formats and modes).

Portability functions block 140 may include time, temperature and compensation functions enabling the portable information appliance to use lower power and smaller size components than otherwise could be used. These functions may work in concert with functions shown in position sensing and processing block 110, and may include a sensor rotation platform, a calibration test, or similar device leading to error, distortion, noise and drift detection and recovery information.

An electro-mechanical connection may be used to effect some embodiments of the invention. In one illustrative embodiment, the present invention may be provided in a non-intrusive, compact, add-on device that is adapted to be mounted to a portable information appliance such as the Palm®. Many portable information appliances have an input port such as, for example, an RS 232, USB, IR, parallel or any other type of input port. For example, the present invention may be implemented as an add-on device that is connected to the back of the Handspring® PDA in the accessory slot.

Figure 5B:
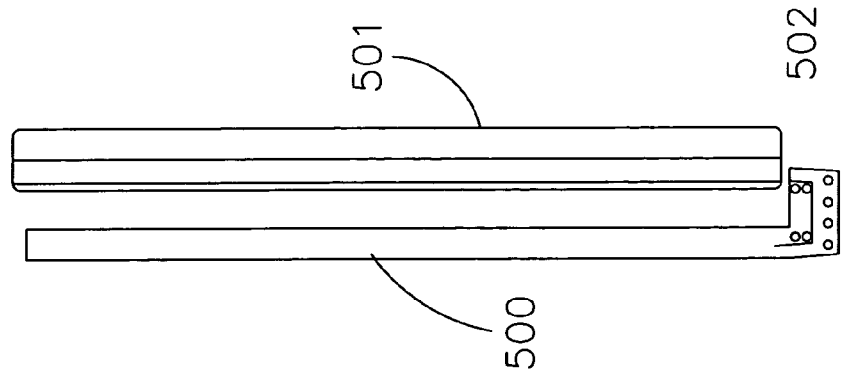
FIGS. 5a and 5b reveal an electro-mechanical connection for added functionality to a PDA.
Figure 5A:
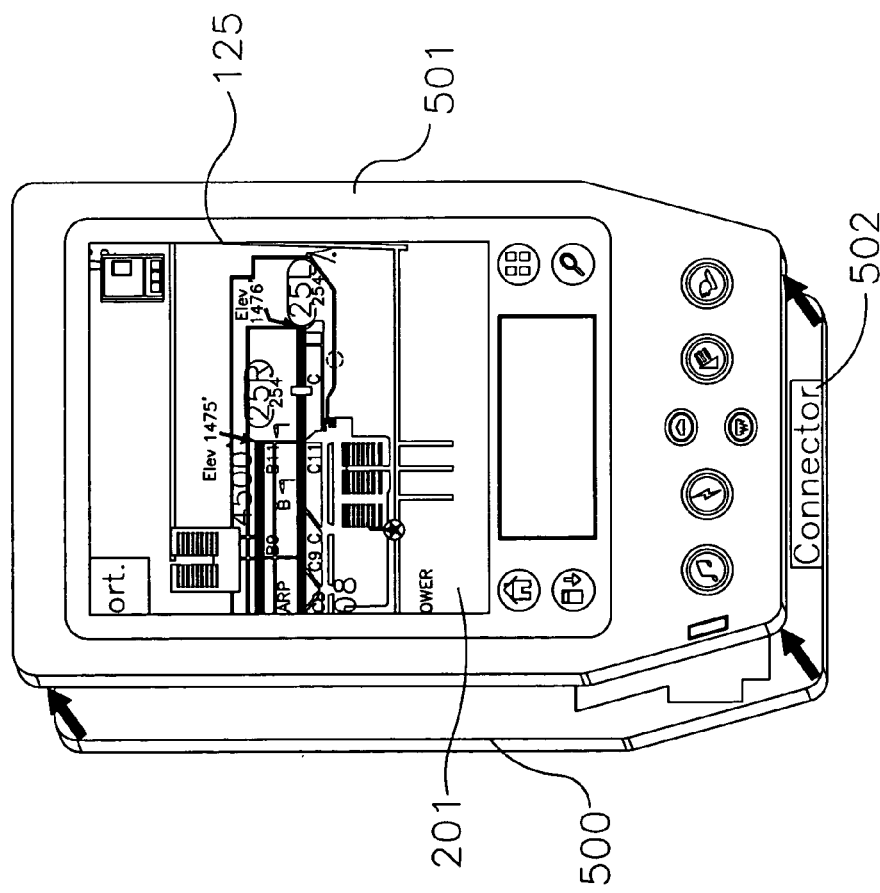

In another illustrative embodiment, and as illustrated in FIGS. 5a and 5b, the present invention may be connected to the PDA via a port that is adapted to accept the PDA cradle. More specifically, a thin (0.2 inch thick) add-on device 500 is clipped to the back of a PDA 501 with a wraparound connector 502 plugging that interfaces with the PDA cradle port of the PDA 501. The wraparound connector 502 may further include a pass-through connector function so that the user need not remove the add-on device 500 when plugging the PDA 501 (or other portable information appliance) into the cradle for traditional functions like synchronization.

It is contemplated that the add-on module 500 may contain its own power (fuel cell or battery, for example) and/or processing resources including a microprocessor, image memory and sensor (camera, MEM's, . . . ), IO resources firmware and software and user interface controls and processing instructions, as desired. Alternatively, the present invention may be incorporated into the portable information appliance itself.

The sensors 111 may be selected to sense one or more degrees of freedom in any combination including temperature, time, pitch, roll, yaw, translational degrees of freedom including X, Y, and/or Z axis, etc. Any one or a mix of sensors may be used. For example, the sensors may include surface-bound sensors such as a ball-mouse, an optical-mouse or any other type of surface-bound sensor. The sensors may also include locale-bound sensors, such as video-metric, pseudo-lite (micro-GPS), acoustic, magnetic, RF, etc. The sensors may also include Free-Travel sensors, such as inertial (pitch, roll and yaw, translation, etc.) sensors, piezo-ceramic film or piezoelectric material (no DC component which may be ideal for some applications), micro-electro mechanical system (MEM's) sensors, global positioning systems (GPS) and differential GPS augmented for real-time operation using, for example, an inertial sensor suite for intra-update readings, RF, etc.

Figure 2A:
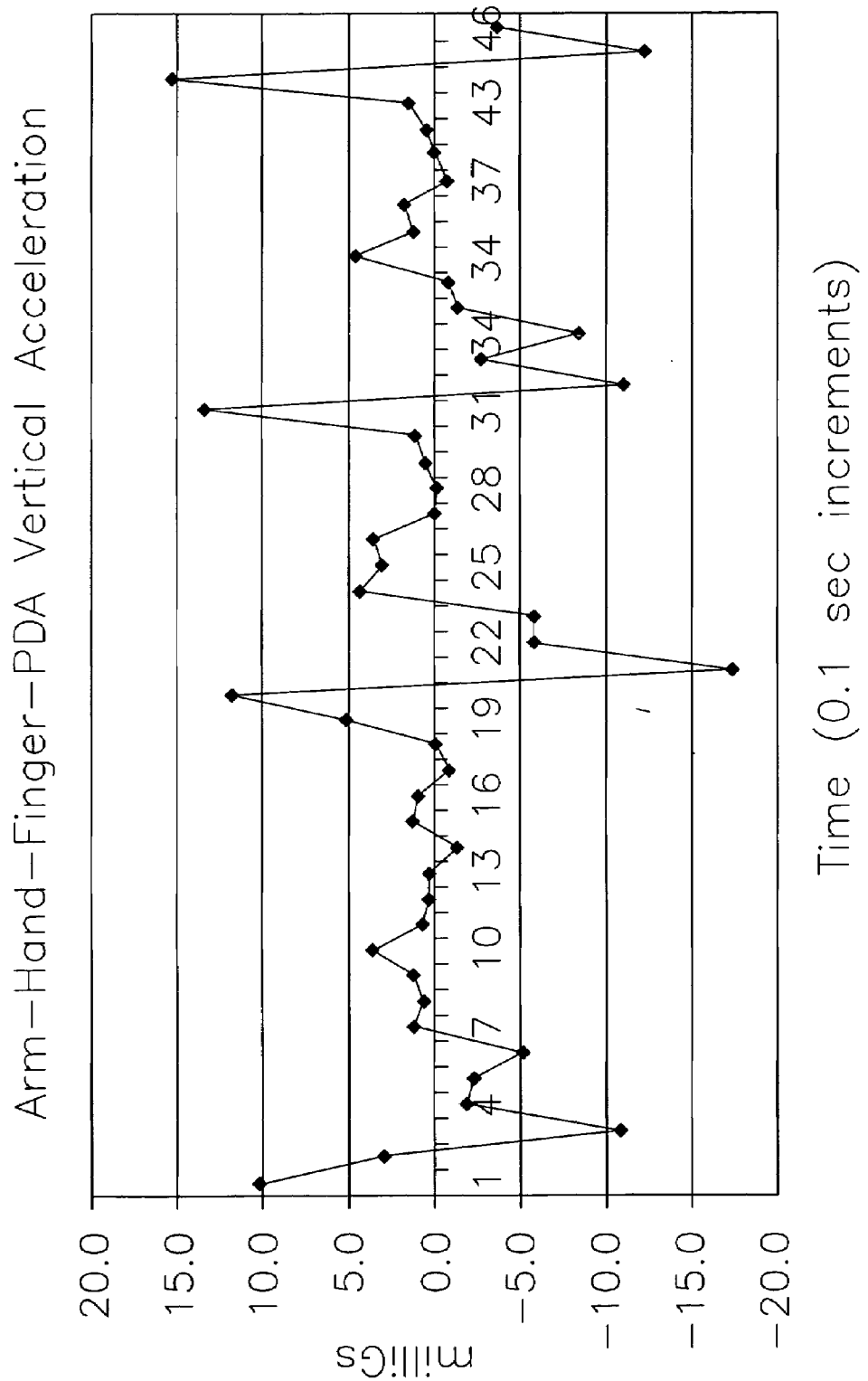
FIGS. 2a and 2b show arm-hand-finger acceleration data in vertical and horizontal directions, respectively.
Figure 2B:
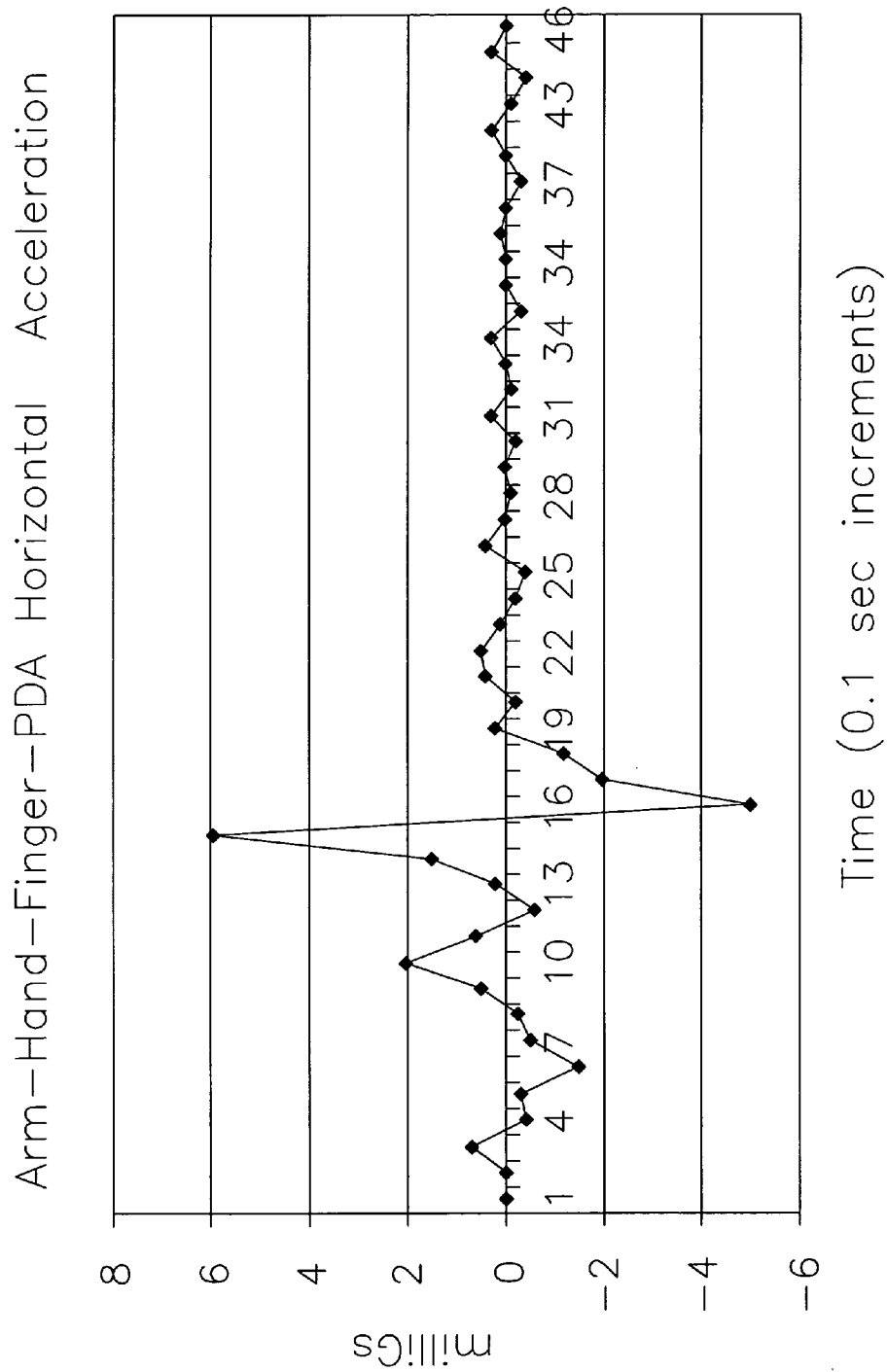

In some embodiments, the device may be tuned to the relatively narrow range of human (body-arm-hand-finger) movement. FIGS. 2a and 2b below show arm-hand-finger acceleration data in the vertical and horizontal directions, respectively. The acceleration data were recorded during a test run of an Arm-Hand-Finger-PDA system, and represents moving a PDA up and down mostly and then left and right. The maximum acceleration shown is about 17 milliGs. Thus, one range for the acceleration sensor (e.g., MEM's sensors) may be about +−20 milliGs. Assuming this test is a mean in a Gaussian distribution, the worst case acceleration range may be, for example, about +−70 milliGs. This is a relatively low value.

Many consumer and some military MEM's ICs go down to as little as 1000 milliGs or 1 G of full span. Accordingly, commercially available one G sensors may be used. However, it is contemplated that a MEM's sensor may be manufactured that is optimized to more precisely match the acceleration range of the arm-hand-finger motion, if desired.

The data were recorded using a video camera recording at 60 Hz but read at 100 millisecond increments (corresponding to a 10 Hz positional update rate to the PDA imagery, which is reasonable). A 5 to 10 Hz update rate is toward the lower end of what would be desirable. An update rate of >=15 Hz and about 20 to 30 Hz might be favorable, depending on the update rate of the display and the application.

In some embodiments, imaging sensors may be used in combination with frame grabbers and image processing software to acquire anchor or reference or fiduciary points including those in the environment and/or in the portable information appliance. This kind of approach may be called "video-metric position sensing". A communication function may be provided to transmit the positional data of the portable information appliance relative to the selected platform. Imaging devices may include, for example, visual, IR, V, multi-spectral, among others.

Cameras, like stationary camera(s)—anchored to the user's environment—mounted in the environment, such as a room, can monitor the position of the portable information appliance relative to anchor points, fiduciary points, or other points of reference in the environment. The anchor points can be special purpose or native to the environment. In the case of special purpose reference points, markers can be used. White spheres mounted to actors have been used in the field of digital animation. In the case of anchor points, which are native to the environment, the system may identify statistically solid points in the room. These need not be stationary. However, in some embodiments, the system identifies consistent, stable and stationary anchor points, such as a white chair or a lamp. The visual sensing system ideally may have cameras, which preclude loss of line of sight of the portable information appliance. For some applications, the camera(s) may be mounted such that the x, y, or the x, y and z components and in some cases the rotational degrees of freedom can be obtained using any of the available techniques, but this is not required. The cameras, on acquiring the location of the portable information appliance, via template matching and center of gravity position calculation, may transmit the portable information appliance location to the portable information appliance, which then adjusts its displayed output as a function of selected functionality and self-position.

If in-situ cameras, such as mobile camera(s) mounted in the viewing-device, are selected as all or part of the sensing function, visual spectrum camera(s) mounted in the portable information appliance may be used. The system may then be trained (via, for example, one time training and calibration or via subsequent periodic or continual training, calibration and refinements) to acquire anchor points within the environment.

In this case, the environmental anchor points may be, for example, a user's head and/or shoulders, facial features such as eyes and/or nose and/or features. Then, when the portable information appliance is moved, the reference to the nose or head and/or shoulders changes. Tensor projection algorithms may be implemented to acquire such features and to steer a mouse symbol on a display, as shown in FIGS. 8$a$-$e$. FIGS. 8$a$-$d$ show the anchors 801 on the face as the extremities of the eyes and the mouth, and these features are tracked as the face moves. FIG. 8$e$ shows an alternative anchor scheme utilizing the chin, nostrils and the bridge between the eyes as anchors 802. The person who has his/her face being tracked according to anchor points 801 or 802 on the face can use face movements to perform functions of a mouse on a computer for many applications. It might be said that using one's nose as a mouse could be regarded as "nouse" technology. So instead of moving the combination display-position-sensor, one may have a visual sensor such as a camera facing the operator, locking onto anchor points on the operator such as features of his/her face. Then a tilt or movement of the operator's face can represent or simulate mouse movement on a display. Such tilt or movement can also provide virtual movement of the display about a document or object represented by the displayed contents. There are other variations of this approach for controlling the contents and operations on the display, which particularly might be useful to physically impaired individuals.

Figure 9:
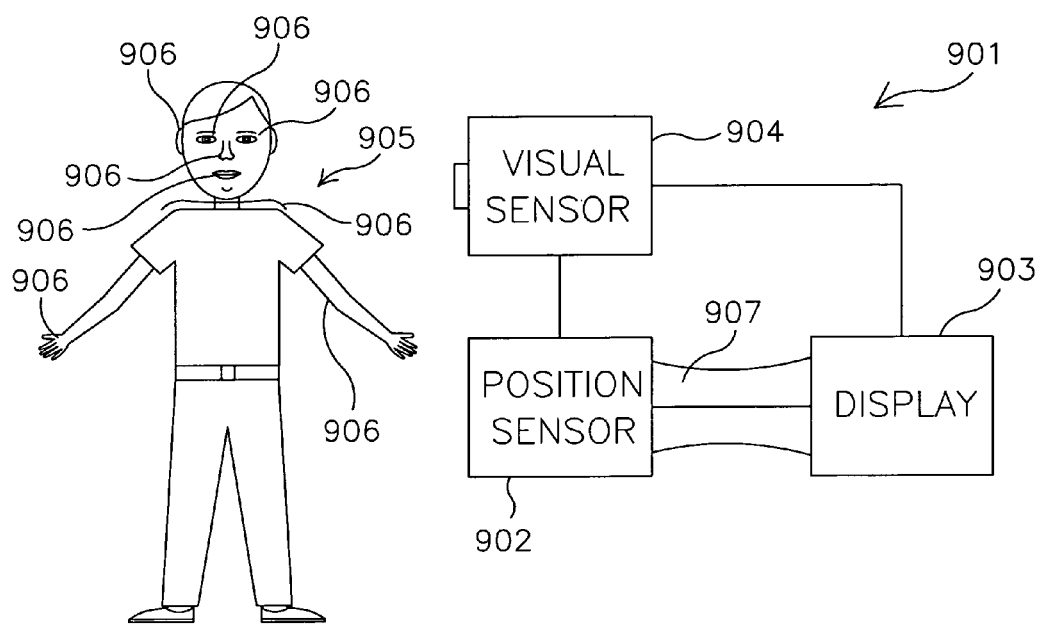
FIG. 9 shows a viewing system that senses features on an operator.

In summary, and in some embodiments, there may be a viewing system 901 having a position sensor 902, a display 903 coupled and attached to position sensor 902 via structure 907, and a visual sensor 904 connected to the position sensor. See FIG. 9. Further, the visual sensor could sense features 906 on an operator 905, and the features would be anchors which the visual sensor identifies. The position sensor would determine a position of the operator according to a position of the anchors as identified by the visual sensor. The position of the anchors would indicate what portion of the subject matter, such as an object, document, map, etc., is to be on the display. The operator would move as needed to see the desired contents on the display. The visual sensor, position sensor and display would incorporate the appropriate processing of algorithms, software and so forth, to effect this viewing system.

Commonly used mouse position sensors may be used in some embodiments. Some common mouse position sensors include, for example a rolling ball, which drives a slotted wheel that permits light to pass from an LED to a sensor. The sensor typically counts the number of light pulses to identify the motion of the rolling ball. In one embodiment, a mouse of this sort may be used to transmit positional data to a portable information appliance via, for example, the standard RS-232 input port at the base of a PDA. X and Y position data may be transmitted and received in this manner. Acquiring software may periodically access a buffer containing the mouse pulse count. This count may be used to learn how far the mouse has traveled in x and in y. The count may be calibrated with respect to distances moved. A gain factor can be assigned so that for one inch actually moved, two inches of motion are shown, for example. A gain of one provides a one to one conformal mapping to the world, which may be used as a documents and users reference platform(s). Gains can be negative, zero or positive, depending on the application.

In another illustrative embodiment, mouse systems that are opto-electronic may be used. Opto-electronic mouse systems typically provide a pulse count in a manner similar to the electro-mechanical mouse systems described above. Having no mechanical parts, they often require little to no maintenance or cleaning to remain functional. Such opto-electronic mouse systems can be mounted into the bottom connector of a PDA or similar device, as desired. These systems may be particularly suitable for desktop applications, where the user does not need the mouse to free float in space.

Figure 6:
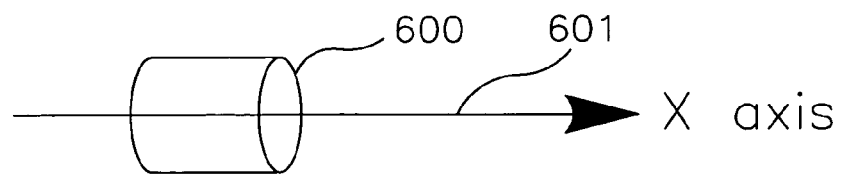
FIG. 6 shows the position of an accelerometer relative to the X direction.

As noted above, inertial sensing may also be used. In some embodiments, the sensor system may be a MEM's-only implementation. MEM's devices are typically small and low cost. In some cases, however, some low cost MEM's devices can produce relatively large acceleration biases and noise. FIG. 6, for example, illustrates an accelerometer 600 along X axis 601 for the purpose of showing short term position error due to acceleration error. The acceleration bias of some low cost MEM's technology is about 5 mGs. AB=Acceleration Bias=5 milliGs=0.005×32 ft/sec/sec×12 inches/ft=1.92 inches/sec/sec. Aout=Atrue+AB. Xout=Xtrue+sigmax. SigmaX=Error in indicated Xout=½(AB)$t^2$=1 inch of error induced each second. Thus, the error induced over each second is about 1 inch. One inch of uncertainty, accumulating every second, can result in unacceptable error. As such, if the user wishes to dwell on a particular location in an image, he or she may see the image drifting an inch every second, in some cases.

To reduce this effect of some low cost MEM's devices, and in some embodiments, user participation may be used. The user may, for example, press a button (or leave a button unpressed) or similar annunciation and/or selection to notify that the portable information appliance is stationary and that calibration may be performed.

Because of errors like zero-g bias, noise, rotational motion (inclination, tilt . . . ) and temperature and temporal drift associated with some low cost MEM's devices, an effective MEM's-only implementation may involve periodic calibration. This may be added relatively unobtrusively by having the user press (or not press) a button whenever he or she wants to activate the viewed-object-as-stationary mode of scrolling. This may perform at least some of the following functions: 1) with appropriate instructions to the user, the portable information appliance may alert the user for the need to hold the PDA or similar device stationary and at a user-favored orientation just prior to pressing the button; 2) it may enable the portable information appliance to calibrate itself with respect to whatever the user considers a stationary and proper orientation with respect to gravity, etc.; 3) it may encourage the user to limit activation for only relatively short bursts of time, which may alleviate long term double integration errors; and other functions, as desired.

In such a system, the output of a MEM's 111 device may be measured. The result may be filtered using filters 112 to eliminate out of band noise. The relevant information 113 may then be extracted, and encoded as X and/or Y and/or Z, for use by the system as 114. Finally, the location value may be stored in the compensation function 115 for subtracting or inverse filtering later, when the user releases the measurement button and/or annunciator.

Another method may characterize the acceleration bias as a function of time and temperature and to compensate, sometimes in software, using look up tables or parametric equations as the system senses time and temperature. Limiting the bandwidth of the device may be desirable to limit the range of peak-to-peak noise spikes and associated vibration of the image. A position sensing bandwidth of 5 Hz is recommended during slow movements and 30 Hz for capturing slew.

In some embodiments, the bandwidth of the system may be mode dependent. High accelerations of sufficient duration may switch the portable information appliance to a high bandwidth slew mode. The portable information appliance may be implemented to include multiple bands of acceleration detail resulting in fine grained, medium grained and coarse grained acceleration and motion readings available for system selection and use. This can lead to a hierarchical arrangement and availability of motion control, transport delay, modes and effects.

Figure 7:
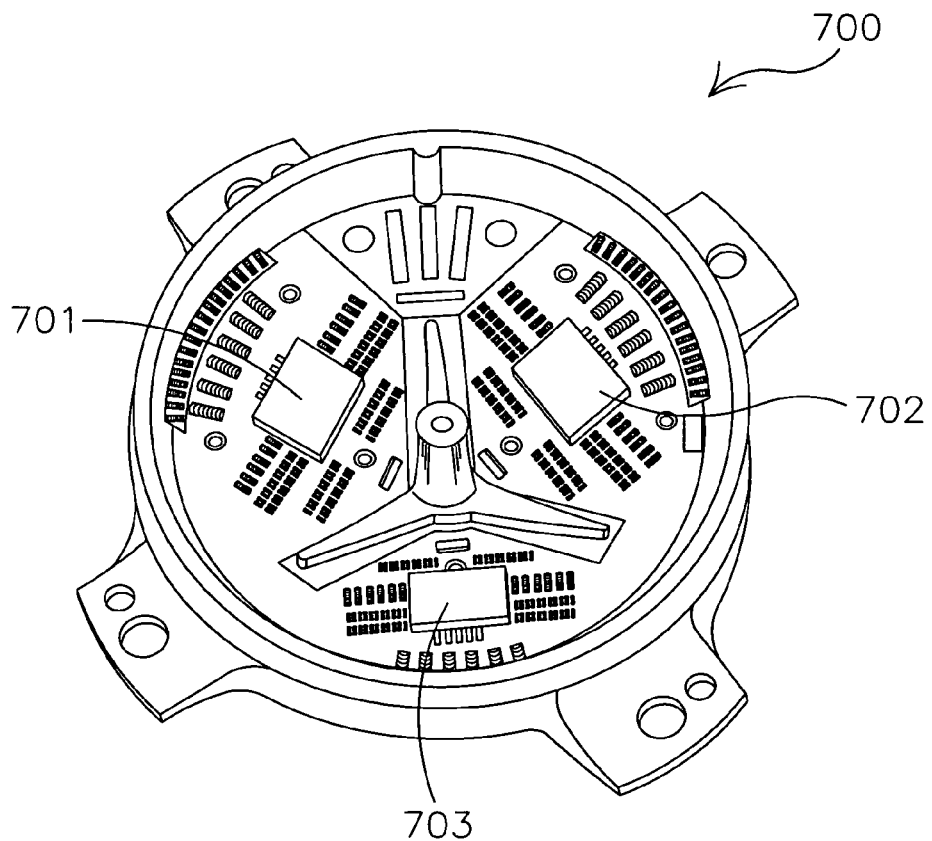
FIG. 7 lays out a MEM's delta arrangement of accelerometers for sensing in the X, Y and Z directions.
Figure 8E:
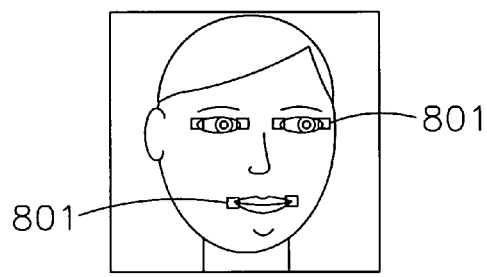
Figure 8E:
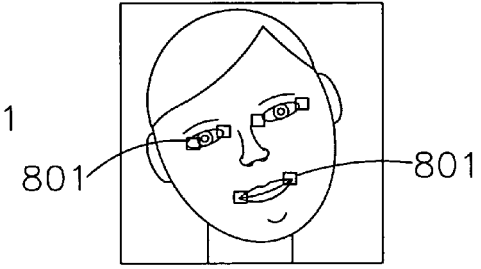
Figure 8E:
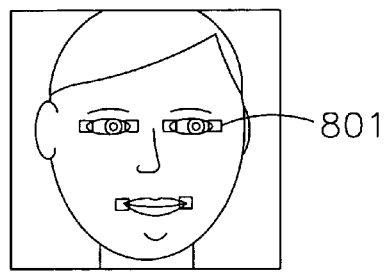
Figure 8E:
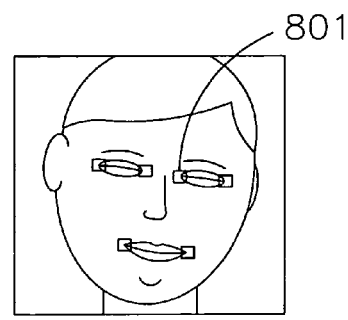
Figure 8E:
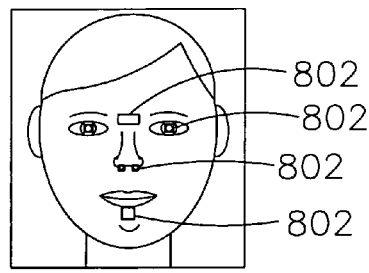

If accelerometers alone are selected, and if the system must have sufficient accuracy and tolerance with respect to varying degrees of freedom such as pitch, roll and yaw, then six accelerometers may be used to determine translational motion. Three accelerometers, each 120 degrees apart in one plane and at a tilt of 30 degrees, for example, in an orthogonal plane, and three gyroscope MEM's may be used to supplement the readings of the other sensors and to help eliminate bias and noise effects. The vector components can be used to compensate for configuration gain differences as can one-time or periodic calibration events. FIG. 7 shows one possible arrangement 700 of a delta arrangement of MEM's accelerometers 701, 702 and 703. These are arranged to report translational acceleration along three degrees of freedom, x, y and z and angular orientation, pitch, roll and yaw, in this case.

When longer times are desired between calibration updates, double integration errors using some MEM's devices can be overcome by, for example, combining the MEM's devices with a GPS or differential GPS or some other position sensing system (magnetic, specifically a magnetometer, for example), which has acceptable positional accuracy from time to time. In such a configuration, the MEM's device can be used to provide readings in-between the slower updates of the GPS, for example. It is envisioned that some applications of GPS may be enabled to higher accuracy as may happen in military operations.

In the case of the inertial sensor, 111, 112, and 113 provide the signal, filter for in-band content, and integration to provide velocity and then position information in real time. These may be implemented by a combination of hardware, firmware and software as desired. The motion compensation function 115 may provide inverse information to the roaming 122 and the rendering 123 functions. Gain may be applied to effect 1:1 conformal mapping so that for each inch the portable information appliance is moved, the image is moved in reverse to effect conformal motion in object space. The object, therefore, may appear to remain stationary. Specifically, for each inch the portable information device is moved to the left, the image displayed is moved one inch to the right resulting in a net velocity of 0 inches for the displayed image.

Alternatively, and for some applications, alternative gain factors may be used. For example, in a surgical application, where the motion of the portable information appliance is large, the motion in object space may be small. Movement in object space may be minified, so that major movement of the portable information appliance can produce minor movement in the object space. For other applications, movement in object space may be magnified, so that minor movement of the portable information appliance can produce major movement in the object space.

In another illustrative embodiment, MEM's devices may be used in conjunction with magnetometers to track position. Some MEM's devices are more accurate at detecting high frequency motion, and less accurate at detecting low frequency motion. Magnetometers, on the other hand, are often more accurate at detecting low frequency motion and less accurate at detecting high frequency motion. It is contemplated that the output of one or more MEM's devices may be blended with the output of one or more magnetometer devices to provide an output that is relatively accurate at detecting both low and high frequency motion. The blending of the MEM's device output and magnetometer device output may be based on calculated sensor difference signals.

In another illustrative embodiment, a small ultrasonic sensor may be attached to the portable information appliance. Or an IR sensor may be positioned in the environment, perhaps along a sensor bar of other types of sensors. The system may then detect the location of the portable information appliance at selected intervals of time relative to the sensor bar, and report back the portable information appliance location. One similar sensor system, (i.e., a whiteboard called "mimio" made by Virtual Ink Corporation of Boston), can detect the position of a pen relative to a whiteboard.

User interface may involve display formats and modes. Magnification may be implemented as a discrete or continuous function of (1) user selection; (2) distance from the eye reference point; (3) distance with respect to a user chosen or default reference platform or point, which may be a room in a building, a table or the earth's surface, etc. User scaling may be done by, for example, enabling, selecting, or pressing a switch, knob or soft-switch or soft-knob or similar control device.

Motion and the scaling can be accomplished in any number of ways, including selecting an appropriate discrete image, using 3D graphics techniques such as tri-linear interpolation and/or by arithmetically transforming (e.g., via affine transforms) vector representations of the images, etc. It is contemplated that the images may be maps, alphanumeric, photographic, 3D CGI, volumetric, etc. An embodiment for bit mapped image content is to use selected discrete images for low cost, low performance portable information appliances, and to use tri-linear interpolation for higher performance portable information appliance. The latter affects smooth transitions and utilizes discrete images of the same scene, each with differing levels of detail from high to low. The blend of any pair is shown on the screen as the depth changes from one to the other in a continuous fashion. Thus, the magnification can be discrete or smooth. It can be implemented using pre-stored images having power of two resolution differences, for example. Interpolation can be implemented between any pair of proximate resolution representations for continuous changes.

Scaling and accompanying interpolation can be performed periodically on user request, or automatically or in real-time on a pixel-by-pixel basis, using a combination of hardware, firmware and/or software as required to meet performance objectives. Interpolation can be implemented using, for example, nearest neighbor, bi-linear, tri-linear, 2D or 3D cubic B-Spline, etc.

An embodiment may use vector imagery, which can be moved and scaled smoothly over the gamut of very large to very fine. It also may be used to maintain geometric ratios, relationships and attributes, including anti-aliased edges and lines. Further, line thickness can be enabled to scale relative to the image or remain fixed, the mode being selected by the user or the application.

Figure 3:
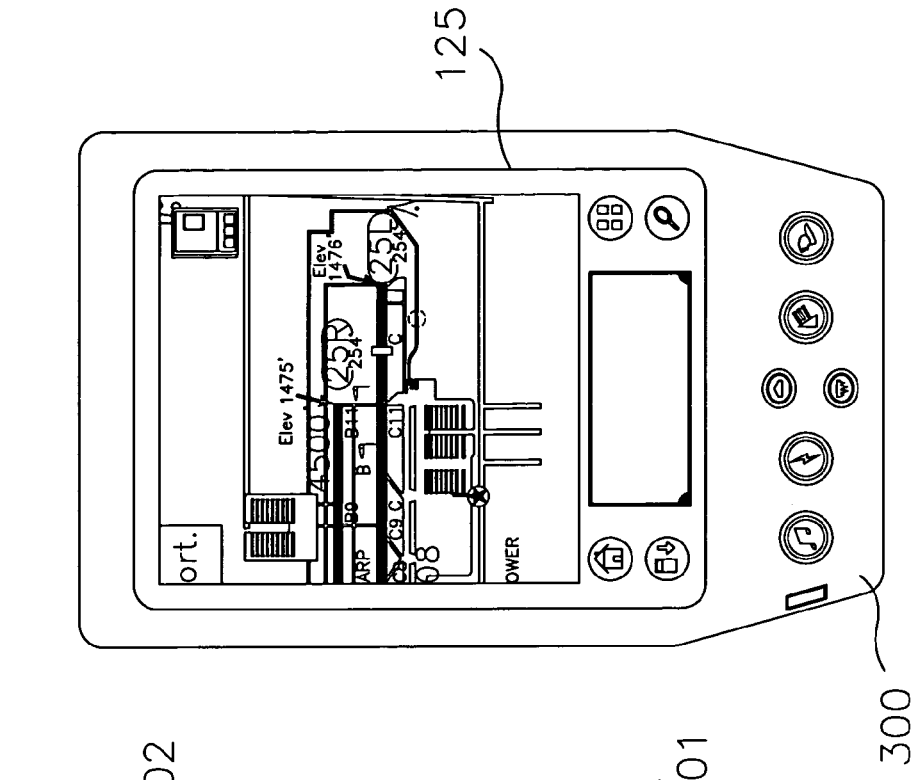
FIG. 3 reveals a display of a PDA showing both global and local views simultaneously.
Figure 4:
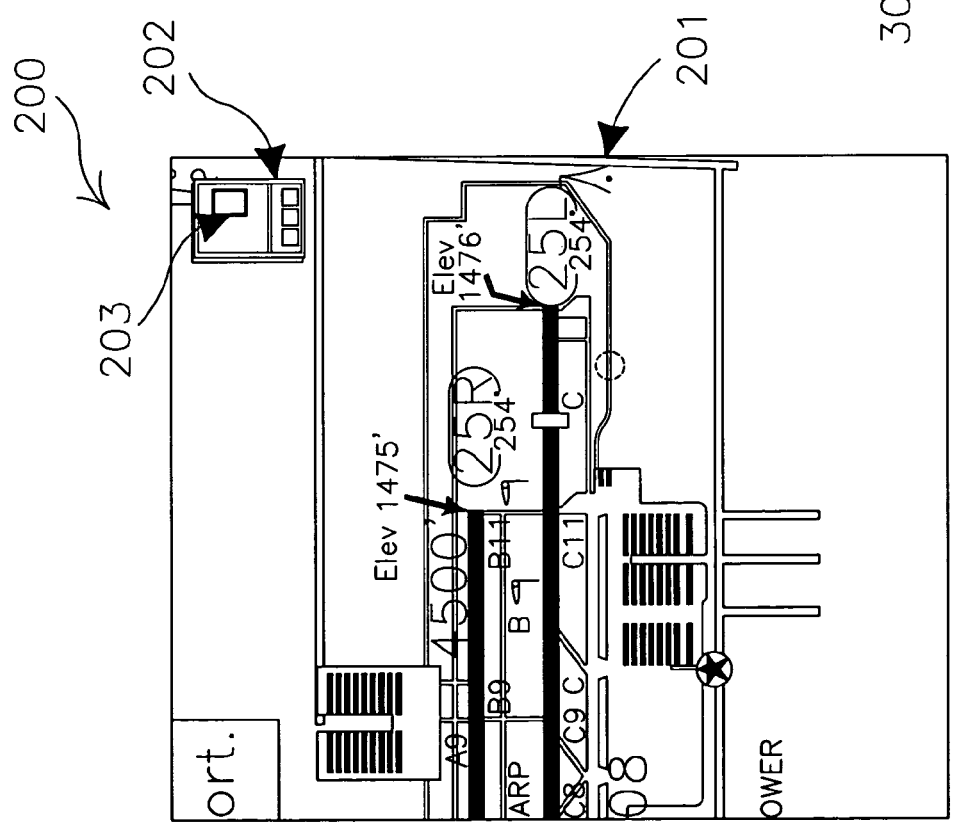
FIG. 4 shows the views of FIG. 3 implemented into a control device with a window such as with a Palm® PDA 300.

The combining of global and local views can be used to provide a "bird's eye" view of the region of interest. In cases where it is desirable to aid the eidetic memory of the user, the portable information appliance display format may be augmented to include simultaneously available views of the local and the global scenes. FIG. 3 details an example showing both global and local views 200, simultaneously. Item 201 shows the combined global and the local views 200 presented on the portable information appliance display. The region of interest dominates the presentation. Item 202 shows the inset, which displays the complete document and a region of interest inset (local view inset 203). As the user moves the portable information appliance in space, the local view 203 will move, expand and shrink within the global inset 202 in a manner that corresponds to the motion and magnification of the local image 201. FIG. 4 shows the resulting co-resident global and local views implemented into a control device with a window such as with a Palm® PDA 300 using the present invention.

There is the hybrid functionality of the mobile and stationary object transport. When there are objects that are bigger than the range of motion available to the user, a combination of traversing methods may be used. For example, if the range of motion available to the user has been exhausted, the user may need to be able to return to a point within the range of available motion. This may have the effect of repositioning the user to a new reference point relative to the document or object. In some embodiments, a hybrid of the anchored display and the mobile display functionality (or conversely, a hybrid of the mobile object and the stationary object) may be used.

For a ball-mouse or optical-mouse type of sensor system, the system may add an additional sensor whose function is to indicate when the mouse (or, in some cases, the portable information appliance itself) has been lifted from a surface. This may be accomplished by, for example, a weight-activated switch. Alternatively, or in addition, optical feedback may be used, wherein the light path is a function of surface proximity. When the user lifts the mouse or other device, the user halts traversal in object space, returns to a convenient place in the user's available range of motion, rests the mouse or other device on or proximate to the surface again, and resumes traversal in object space from the lift-off point.

For sensors that enable motion detection in free space (no surface), the hybrid functionality may be implemented using: a button or a pressure sensor, conveniently placed for ergonomic principles, for example, in the upper left or right corner of the device. Voice actuation, motion or position induced actuation (e.g., shaking, a marked positive and negative acceleration, user selected or trained (signature) pattern of motion, motion in the depth axis as if lifting off a virtual surface, or any other activation method may be used to activate the device.

Motion or position induced actuation may be implemented using, for example, properly compensated inertial sensors (a sensor in the Z axis is good for document viewing), videometric methods, pseudolite (micro-GPS) methods, acoustic position sensing methods, magnetic methods, RF methods, etc.

It is envisioned that some users and applications may benefit from movement in discrete steps, fixed for example in two or three inch increments. Hysteresis may be used to enable transport in the object space to happen in bursts while the actual movement of the mouse (or in some cases, the portable information appliance itself) is smoothly done under operator control. Hysteresis may be accomplished within the sensor component, in firmware or software, as desired. The sensor data may be continuously gathered, accumulated and compared against an x or y window comparator for example. Once the accumulated value of distance traveled exceeds a modulus, 3 inches for example, then the x or y position of the view space is incremented to the next corresponding view address (image patch or view volume block).

One may perform 3D and volumetric viewing with the invention. If the portable information appliance is implemented using free space position sensing, for example, the user may move the portable information appliance in ways that enable walking around the object and to see into the object. Seeing into the object or volumetric viewing may be enabled by, for example, using the free space sensors in combination with a 3D object model and the appropriate volume viewing software.

Although the invention has been described with respect to at least one illustrative embodiment, many variations and modifications are contemplated. It is therefore the intention the appended claims be interpreted as broadly as possible in view of the prior art to include all such variations and modifications.

What is claimed is:

1. A viewing system comprising:
   means for position sensing and processing, wherein said means for position sensing and processing comprises:
      a spatio-temporal sensor; and
      means for motion compensation connected to said spatio-temporal sensor;
   means for image management and rendering connected to said means for position sensing and processing, wherein said means for image management and rendering comprises:
      an image source;
      a roaming memory connected to said image source and to means for motion compensation;
      a rendering engine connected to said roaming memory and to said means for motion compensation;
      an image memory connected to said rendering engine and to means for motion compensation;
      a display connected to said image memory; and
      an image on said display, wherein said means for position sensing and processing detects movement of the device in free space, wherein said means for position sensing and processing detects movement relative to at least one positional reference, wherein the at least one positional reference is external to the viewing system, and wherein moving the display relative to the at least one positional reference reveals on said display a similar movement of the display to another portion of a displayed image; and means for user interfacing connected to said means for position sensing and processing and to said means for image management and rendering.

2. The viewing system of claim 1, further comprising means for portability.

3. The viewing system of claim 2, wherein said means for portability comprises:

small-size enabling capabilities; and low-power enabling capabilities.

* * * * *